Oct. 9, 1956     L. D. WRIGHT ET AL     2,766,254
PROCESS FOR ISOLATING BIOCYTIN
Filed Nov. 7, 1952
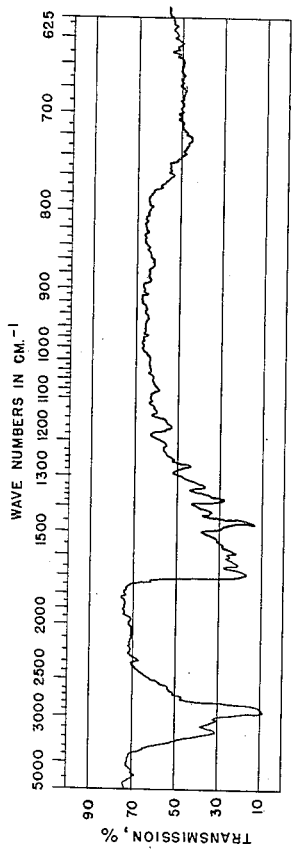
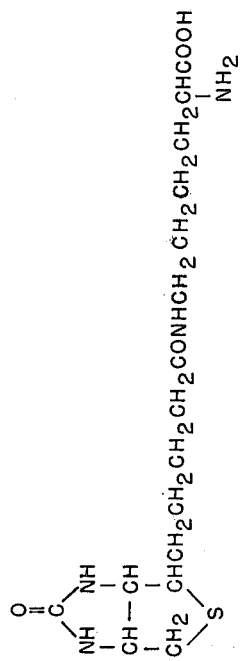
LEMUEL D. WRIGHT
THOMAS R. WOOD     INVENTORS
KARL FOLKERS
BY *Raymond Underwood*
ATTORNEY United States Patent Office 2,766,254
Patented Oct. 9, 1956

2,766,254

PROCESS FOR ISOLATING BIOCYTIN

Lemuel D. Wright, Broad Axe Village, Ambler, Pa., Thomas R. Wood, Hockessin, Del., and Karl Folkers, Plainfield, N. J., assignors to Merck & Co., Inc., a corporation of New Jersey Application November 7, 1952, Serial No. 319,354

2 Claims. (Cl. 260—309.7)

This invention relates to new derivatives of biotin, this biotin being in the nature of a complex.

The recovery of biotin from both vegetable and animal sources is known. The compound of the present invention is a complex of biotin, but it possesses chemical, physical and microbiological properties which distinguish it from biotin. The compound with which this invention is concerned has been found to encourage the growth of the organisms *Lactobacillus casei*, *Lactobacillus acidophilus*, *Lactobacillus delbrückii* LD₅ *Streptococcus fecalis* R, *Saccharomyces carlsbergensis*, and *Neurospora crassa* in a basal medium deficient in biotin while in the same concentration of yeast extract *Lactobacillus arabinosus*, *Lactobacillus pentosus* and *Lactobacillus mesenteroides* P-60 would not grow. Acid hydrolysis of the yeast extract rendered the biotin available to all the organisms. These microbiological findings indicate that this substance of the invention is different from biotin itself. This complex has been termed "biocytin."

In the acompanying drawings, Figure 1 is a graph showing the infrared transmission of the compound.

Figure 2 is a structural formula of biocytin.

Biocytin is obtainable from natural sources which have undergone a controlled autolysis. It has been unobtainable from growing materials and has been obtainable only from such natural materials which have undergone further treatment in the nature of a synthetic processing.

Possible sources of biocytin are yeast extract, other fermentation by-products, such as corn steep liquor and antibiotic production culture medium, as well as animal sources, such as liver, pancreas, and other tissues. In all instances it is necessary that these materials have undergone at least partial autolysis under artificially created conditions different from that existing during growth. The yeast extract which is ordinarily obtainable has already been subjected to such synthetic conditions.

As only a minute amount of the active substance can be derived from the yeast extract, it was necessary to devise a process for its production and concentration. It can be expected that from yeast extract only about one to two micrograms of the active substance can be obtained per gram of yeast extract. In accordance with the present invention, a process is devised for the recovery of this minute constituent of the yeast extract so that it may be put to a useful nutritional purpose.

The yeast extract which is used as the source of the material is available in commerce. Any source of it may be useful in carrying out the present invention, having in mind the fact that some sources may contain a greater amount of the nutritional substance than others.

The yeast extract as obtained may be of a paste-like or powdered consistency. It is desirable to first dilute it with water. The amount of water which is so added is not critical, but is preferable that sufficient water be added so that about a 4% solution is obtained. The concentration can be as low as 1%, but this involves handling of greater quantities of liquid. Greater concentrations than 10% involve additional problems of filtration.

It is desirable that this slurry containing the yeast extract be first clarified with lime. However, this step may be omitted without impairing the results to be obtained inasmuch as the lime treatment serves merely to eliminate material of a colloidal nature that impairs subsequent filtration. In this procedure the solution is brought to approximately pH 10 by the addition of lime. The amount of lime which is added may vary considerably, principally because, as has been mentioned, this is not a critical step. For example, about twenty-five parts of lime is added per one hundred pounds of yeast extract so as to attain a pH 10; fifteen to thirty pounds is usually required, the attainment of pH 10 being the determining factor. After the addition of the lime, the slurry is stirred for at least a few minutes and is then filtered, but separation can be accomplished as well by centrifugation or decantation. If accomplished by filtration, it is best to use a filter press.

The filtrate which is so obtained is treated with hydrochloric acid to give pH 7 and is then treated with an adsorption carbon, this adsorption carbon being of the character which is common in the chemical industry. For example, this may be an activated charcoal such as that sold under the trade names of "Norite" and "Darco." Satisfactory results will be obtained if the adsorption carbon is added in quantities so that from one-half to ten parts, and preferably 0.75 part of it are present for every one part of yeast extract in the solution. After the addition of this "Norite" or "Darco" or other adsorption carbon, the slurry is stirred at least several minutes, but it is best that this be carried on for a half hour or more to assure a greater degree of adsorption. This adsorption step can be carried out under a wide range of pH conditions, but the greater the acidity the greater will be the extent of the adsorption of the active substance per unit weight of the carbon employed. It is commonly carried out at a pH of approximately 7 such as by the addition of any organic or inorganic acid.

After the carbon and the yeast solution have been so mixed, it is filtered. This may be accomplished by passing it through a filter press, but it will be clear that the the slurry may be centrifuged or decanted to obtain the desired separation. The active material will have been adsorbed upon the adsorption carbon and the filtrate is consequently discarded.

The adsorption carbon is now eluted with an alkaline liquid. This may, for example, be a liquid such as aqueous pyridine or aqueous ammonia. Particularly beneficial results are obtained if alcohol is also present. Thus, the mixture used can consist of alcohol, water and ammonia, or can consist of pyridine, alcohol and water. A satisfactory elution mixture may be obtained by adding five parts of concentrated aqueous ammonia to ninety-five parts of 50% methyl or ethyl alcohol, but this is not a critical relationship as variations from this mixture are permissible.

To remove the active substance, about one hundred gallons of the elution mixture may be used per seventy-five pounds adsorption carbon, but lesser amounts of the elution mixture may be used, although too small an amount will result in a thick slurry which would be difficult to filter. Greater amounts of the elution mixture may be used but this will be uneconomical. This elution is preferably carried out at 70° C., although temperatures from 20–100° C. may be used. Best results are obtained if the adsorption carbon is subjected to two or more elution steps, each employing a fresh elution mixture, these several eluates being combined. The active substance is now in this eluate.

This eluate is separated from the adsorption carbon by any common means such as a filter press and is then concentrated in vacuo to a solid content of 10% or more. If a non-volatile alkali has been used, it is removed by extraction or neutralization. For example, if pyridine is present, it can be extracted and removed by diethyl ether, and if an alkali such as sodium hydroxide is present, it can be merely neutralized. If the alkali is a volatile one, such as will generally be the case, its removal is accomplished by evaporation.

The aqueous eluate solution is then adjusted to a concentration of 10% with respect to dry matter by the addition of water. A considerably denser concentration will slow up the operation in the subsequent step and a very dilute concentration will be uneconomical. The pH is then preferably adjusted to 6–7. Some variation in pH can occur. A pH greater than 7 results in some decrease in the adsorption of the constituents of the eluate, and a pH less than 6 results in an increased adsorption of these constituents. For the purpose of the present procedure, it may be mentioned that to obtain the desired loose binding of the constituents of the eluate on the adsorbing material, the pH should be in the stated preferred range, but it is possible to operate below pH 6 and obtain satisfactory operation.

This eluate is then poured onto a chromatographic column, this column being packed with a mixture of "Superfiltrol" and filter aid. "Superfiltrol" is the trade name for a refined fuller's earth and the filter aid may be such common substances ordinarily used for this purpose. One such filter aid is sold under the trade name "Celite 545." Using these particular ingredients, about one part of "Superfiltrol" is used with two parts of "Celite 545" to obtain a practical operating time. An increased proportion of "Superfiltrol" will increase the operating time and vice versa. With this preferred ratio of one to two, it is desirable to use about as much adsorption mixture in grams as is added of eluate in cubic centimeters, it being realized that increased amounts of "Celite 545" in the adsorption mixture will make it advisable to add proportionately less of the eluate.

After the eluate has been completely taken up in the adsorption mixture, the column is then washed with water in the proportion of about three times as much water as eluate put on the column. However, satisfactory results can be obtained if this wash water is two to five times as great. The water extract of the columns carries with it undesirable constituents and is therefore discarded.

The active material to be recovered by the invention is now present upon the "Superfiltrol" and is removed therefrom by fresh elution mixture such as has been referred to, but it is preferred that the stated alcoholic ammonia mixture be used. It is desired that at least three parts and preferably four or more parts of the alcoholic ammonia be added for each part of the eluate initially poured on the column, this ratio being in volume Materially greater amounts than a ratio of four to one are uneconomical.

The alcoholic ammonia which is now recovered and which contains the active material is concentrated in vacuo to remove ammonia and alcohol. However, if one of the other elution mixtures is used, the above mentioned procedure for concentration is followed. The aqueous eluate solution is then adjusted to a concentration of 10% with respect to dry matter by the addition of water. The pH is adjusted as before, but a pH of 6–7 being again preferred.

This solution is then poured onto a fresh chromatographic column containing a mixture of "Superfiltrol" and filter aid such as explained above. It is important, this time, that there be about fifteen times as much "Superfiltrol"-filter aid as the dry matter in the solution which is to be passed therethrough. With the proportions of "Superfiltrol" and filter aid which are present, there is about five times as much of the fuller's earth present as the dry matter in the solution. It would appear that it is quite important that this relationship of about fifteen times as much "Superfiltrol"-filter aid as the dry matter content of the added solution be carried out in order to obtain best results. The active material is adsorbed upon the "Superfiltrol" in the chromatograph column.

Fractional elution is now accomplished by washing with water according to the techniques of chromatography. Ordinarily a total of at least twenty times as much wash water should be used as the original eluate which was poured on the column. Those portions that are found by microbiological assay to have the highest content of biocytin are combined and evaporated to dryness in vacuo. This assay can be carried out by use of any of the aforementioned organisms capable of utilizing biocytin, or by use of any of the organisms provided that the aliquots to be assayed are subjected to acid hydrolysis prior to the microbiological determination.

The dry product thus obtained is mixed with from two to twenty and preferably about ten parts of water by weight. To this aqueous suspension is then added alcohol to a concentration of approximately 85% with respect to alcohol. The alcohol which is used is preferably ethanol, but methanol may be employed as well. This alcoholic mixture is now subjected to centrifugation in order to remove the inert materials which have been precipitated. The biocytin remains in the liquid. A second treatment with water and alcohol, similar to the first treatment, is carried out upon the solids to extract additional amounts of the active material. This second alcoholic suspension is then centrifuged and the liquid obtained is combined with the first centrifugate.

This combined liquid which is recovered from these centrifuging steps now is poured over alumina in a chromatographic column. It has been found that more than fifty times and preferably approximately one hundred times as much alumina should be used as dry matter in the liquid which is to be added to it, in order to obtain satisfactory results. Some varieties of highly refined activated alumina will cause too tight an adsorption of the biocytin and consequently it is advisable to select an alumina which will not result in irreversible adsorption of the biocytin.

The biocytin will remain upon the alumina over which it is poured. The alumina then is subjected to chromatography with dilute methanol or ethanol. If ethanol is used, it should be as a 25 to 75% aqueous concentration and preferably as a 50% aqueous concentration by volume. Concentrations of the alcohol above this range do not produce a practical elution of biocytin. Lower concentrations of the alcohol do not yield a satisfactory separation of the biocytin from the contaminating dry matter in the selected fractions. The biocytin now appears in certain of the alcoholic eluate fractions, as determined by microbiological assay. The total amount of alcoholic elution mixture used should be at least forty times the amount of original liquid poured on the column.

The alcoholic eluate fractions containing most of the biocytin are combined and concentrated in vacuo to remove the alcohol. The aqueous solution thus obtained is then shaken with butanol in a separatory funnel to remove inactive material. This is best carried out at a pH of 6 or less, the pH being first adjusted by the addition of any common acid to the aqueous solution. The aqueous phase is drawn off and should be shaken in like manner several times with fresh butanol, each time about equal parts of butanol and the aqueous phase being used. The butanol extracts contain only inactive material and are discarded.

The biocytin is then extracted out of the aqueous phase with cresol or phenol. This is primarily to eliminate the inorganic matter which has been acquired during chromatography of the biocytin concentrate on the alumina. Cresol is preferred because it will absorb less water and therefore less of the contaminating material. Phenol and cresol appear to be about equal in their capacity to extract the biocytin. Any one of the cresols may be used, but the commercially available mixtures appear to work as well.

The active material is now in the cresol or phenol, and the two phases are now separated as by centrifugation, the water being discarded. The cresol or phenol solution which is so obtained is then mixed with a liquid which is immiscible with water, miscible with cresol or phenol, and in which the biocytin is not soluble. Diethyl ether or ethyl acetate are suitable and from two to ten, and preferably five parts of the selected one is added relative to the cresol or phenol. These substances serve to decrease the solubility of the biocytin in the cresol or phenol. This mixture is then extracted repeatedly with water to recover the biocytin into this water. The aqueous extracts are drawn off and then are combined and the water content is eliminated by evaporation or by lyophilization. The dry product then is dissolved in 85% aqueous ethanol or methanol and rechromatographed on alumina, the entire subsequent procedure which is above outlined being carried out to obtain biocytin of substantial purity.

Alternatively the aqueous extract from the cresol may be subjected to repeated countercurrent distribution. To carry this out a solvent phase is chosen such that when distributed between this solvent and water at pH 3, biocytin shows a partition coefficient of 1. A suitable mixture to use in contact with the aqueous phase is one part cresol and one part chloroform. Preferably, this procedure is carried out in a series of separatory funnels.

After distribution, the biocytin contained in the several funnels is forced into the aqueous phase in each, by the addition of diethyl ether or ethyl acetate to the funnels. The aqueous layers are subjected to assay and those containing most of the biocytin are combined. The countercurrent distribution and combination of the selected aqueous layers is repeated until such time as it is found that crystals can be recovered. This is accomplished by concentrating and cooling the selected aqueous layers. The crystalline biocytin thus obtained is then recrystallized from water.

All of the procedural steps which are above outlined are conveniently carried out at room temperature. Some of them, and particularly those involving elution, may be carried out at elevated temperatures to increase the yields obtained.

Although the above procedure has been set forth with particular reference to yeast extract as the source of the biocytin because of its cheapness, it is to be understood that the steps can be carried out to isolate biocytin from other natural materials, such as, for example, other fermentation by-products, corn steep liquor, by-products of antibiotic production, and animal sources such as liver, pancreas or other tissue.

It is to be understood that it is not necessary to carry out each and every one of the procedural steps above outlined in order to obtain biocytin of high purity. Certain of the steps can be eliminated, but this will generally throw a greater burden on the subsequent step or steps inasmuch as a greater quantity of material will have to be handled. It has been mentioned that the lime clarification step can be omitted. In like manner, it is possible to omit the steps of butanol extraction of inactive material, partition with cresol or phenol, and to modify some concentrations and dilutions.

Representative examples are the following:

*Example 1*

One hundred pounds of Standard Brands "Zymyzate" yeast extract are dissolved in three hundred gallons of water.

About twenty-five pounds of lime are added so as to bring the pH to 10, and the mixture is stirred for one hour. The mixture is then filtered with aid of a plate and frame press.

The clear filtrate is adjusted to pH 7 with hydrochloric acid and to it is added seventy-five pounds of "Norite." The mixture is stirred for one hour and filtered with the aid of the filter press.

The "Norite" cake thus obtained is then stirred for one hour with one hundred gallons of elution mixture. The elution mixture is made by mixing fifty gallons ethanol, forty-five gallons water and five gallons concentrated aqueous ammonia. The "Norite" then is filtered off with aid of the filter press. Elution is repeated with a fresh bath of one hundred gallons of elution mixture (alcoholic ammonia). The "Norite" is filtered the second time and the combined eluates concentrated in a vacuum evaporator at a temperature below 40° C. The eluate is concentrated to 10% dry solid content and the pH adjusted with sulphuric acid to 7. Usually about four thousand grams dry matter will now be present at this stage. Any small amount of precipitate present may be removed readily by filtration through paper.

The clarified "Norite" eluate is divided into sixteen portions and each portion is poured onto a chromatographic column. These columns are five and one-half inches inside diameter and about forty inches long. They each contain twenty-five hundred grams of adsorption mixture consisting of "Superfiltrol" one part and "Celite 545" two parts. It will be found that all of the water solution will be taken up by the adsorption mixture.

Each column then is washed with eight liters of water and the water discarded. The active material in each column is eluted by the addition of ten liters of elution mixture made by mixing five liters of ethanol, four and one-half liters of water, and 500 cc. concentrated aqueous ammonia.

The alcoholic ammonia eluate from sixteen such columns is concentrated in vacuo in the Calandria apparatus to a solution containing 10% dry matter. The solution is neutralized to pH 7 by the aid of sulphuric acid and at this stage is clarified by centrifugation and filtration through a small amount of filter aid.

This clarified solution is divided in four parts and poured on four chromatographic columns each containing an amount of "Superfiltrol"-filter aid equal to fifteen times the dry matter contained in the solution to be put on each column. Each of the divisions will ordinarily be found to contain about two hundred and fifty grams of dry matter and therefore each column will contain three thousand seven hundred and fifty grams of the "Superfiltrol"-filter aid mixture. This is the mixture containing one part "Superfiltrol" and two parts "Celite 545."

Fractional elution is accomplished by the addition of forty liters of water, one liter fractions being collected. The major portion of the biocytin is found by microbiological assay to be in fractions 20 through 36. These desirable fractions from one column are evaporated to dryness in vacuo.

The dry material from each column is taken up in forty-five cc. of water and inactive material precipitated by the addition of two hundred and fifty-five cc. ethanol. The inactive material is centrifuged out and a reprecipitation accomplished by suspending the insoluble matter in an additional forty-five cc. of water followed by two hundred and fifty-five cc. ethanol. The second alcoholic suspension is centrifuged, the solids discarded, and the two alcoholic solutions are combined.

The combined alcoholic solutions so obtained from the four chromatographic columns then contain about sixteen grams of dry matter in a volume of about two thousand ml. This solution is divided in four parts and poured on four chromatographic columns each containing one thousand grams of alumina. Each column has an inside diameter of three inches and a length of forty inches.

Fractional elution is brought about by the addition of 50% ethanol to each column. Liter cuts are taken.

Microbiological assay demonstrates that the major portion of the biocytin is in fractions 10 through 20. Fractions 10 through 20 from the four columns are combined and concentrated in the Calandria apparatus to two hundred ml. The aqueous solution is then brought to a pH of 5–6 by the addition of a few drops of hydrochloric acid.

This aqueous acid solution is repeatedly extracted with two hundred ml. portions of butanol until the butanol extracts obtained are colorless. The butanol extracts are discarded. The aqueous layer is extracted with one hundred ml. of freshly redistilled mixed cresols. The mixture is centrifuged to obtain a clear cresol layer which is drawn off with suction.

The aqueous phase is extracted a second time with one hundred ml. of cresol. The combined cresol extracts are treated with one liter of diethyl ether and extracted five times with forty ml. portions of water. The combined aqueous extracts are extracted with diethyl ether to remove dissolved cresol. The aqueous layer then is heated in vacuo to remove ether and then is dried by lyophilization.

Three grams of a biocytin concentrate (14 mg. of biocytin as biotin per gram), obtained as described above, was submitted to a 12-plate countercurrent distribution using 110-ml. phases of mutually saturated water (pH 3) and o-cresol-chloroform (1:1) mixture. The biocytin was forced into the aqueous phase in each plate or tube at the end of the distribution by the addition of three volumes of ethyl ether. The original water phase was in tube 12 at the end of distribution. The aqueous phases were frozen and dried from the frozen state.

The solid product obtained from tubes 3 through 8, found to be the most potent fractions by assay, were combined and 0.65 g. of this material was redistributed in the same system using 20-ml. phases with a total of five plates. The products were isolated as above. The fractions from the second and third tubes showed the best activity. (a biocytin content of 8.3 percent calculated as biotin).

The combined fractions 2 and 3, 200 mg., were redistributed in an 11-plate distribution and the fractions were isolated as described above. Fractions 5, 6 and 7 were found to be most active (12 percent biocytin, calculated as biotin). Fractions 4 and 8 were also quite good (9.1–9.5 percent biocytin, calculated as biotin).

Fractions 4 through 8 of the previous distribution were combined and redistributed in the same way in a 9-plate system. Solid fractions 4 and 5 appeared to be the most active (13.0–14.5 percent biocytin, calculated as biotin). Each of these fractions, on solution in a few drops of water and careful evaporation, deposited white crystals. Separation of the yellow syrup adhering to the crystals left white needles which sintered at 215° and melted at 230–240° with decomposition when heated on the micro-block. The yield of crystals from the two fractions mentioned was about 2.5 mg. Recrystallization from water gave rosets of needles which were washed with methanol and dried; yield 1.5 mg., sintered 223° and melted 228–232°. The crystals gave a faint positive ninhydrin test. In fifty percent ethanol, the crytsals showed in the ultraviolet an absorption maximum at 2520 A. E% 95. In acid aqueous solution the maximum was observed at about 2550 A., and in alkaline aqueous solution the maximum appeared at about 2650 A.

Biocytin is characterized microbiologically in the following way:

The crystalline material is dissolved in an amount of water to give a concentration of ten micrograms per cc. An aliquot of this solution may be demonstrated to have biotin activity when assayed with *Lactobacillus casei* according to the procedure of Landy and Dicken, J. Lab. and Clin. Med., 27, 1086 (1942), but to be inactive as a source of biotin when assayed with *Lactobacillus arabinosus* according to the procedure of Wright and Skeggs, Proc. Soc. Exptl. Biol. and Med., 56, 95 (1944). If a one cc. aliquot of this biocytin solution is autoclaved for one hour with one cc. of 6 N sulphuric acid, the acid neutralized and the mixture diluted to definite volume, it will be found that an aliquot of this solution will yield the same growth promoting activity found prior to hydrolysis with *Lactobacillus casei*, while the activity for *Lactobacillus arabinosus* will have increased to that found before or after hydrolysis with *Lactobacillus casei*. The biotin content of biocytin as defined by its ability to promote the growth of *Lactobacillus caesi* before or after acid hydrolysis and by its ability to promote growth of *Lactobacillus arabinosus* after acid hydrolysis is about 40%.

*Example 2*

The procedure of Example 1 was carried out using corn steep liquor in its usually available commercial form instead of yeast extract. Substantially the same final product was obtained.

*Example 3*

The procedure of Example 1 was carried out using autolyzed liver instead of the yeast extract. Substantially the same final product was obtained.

*Example 4*

The procedure of Example 1 was carried out using instead of the alcoholic ammonia elution liquid, a liquid consisting of five parts of pyridine, fifty parts ethanol and forty-five parts water. The pyridine was removed following the concentration in vacuo step from the eluates by extraction with diethyl ether. Substantially the same final product was obtained.

*Example 5*

The procedure of Example 1 was carried out using instead of the alcoholic ammonia elution mixture a 0.1 normal sodium hydroxide solution. The sodium hydroxide was neutralized prior to the concentration in vacuo step by adding sulphuric acid. Substantially the same final product was obtained.

*Example 6*

The procedure of Example 1 was carried out using instead of cresol, a like amount of phenol. Substantially the same final product was obtained.

*Example 7*

The procedure of Example 1 was carried out using instead of diethyl ether, a like amount of ethyl acetate, to reduce the solubility of the biocytin in the cresol. Substantially the same final product was obtained.

*Example 8*

The procedure of Example 1 was carried out up to the point of obtaining the lyophilized product. It was dissolved in one hundred cc. of 85% ethanol and this was rechromatographed on alumina and subjected to the same subsequent steps set forth in Example 1. A product containing a high percentage of biocytin was obtained.

Upon chemical analysis, the biocytin was found to be epsilon-N-biotinyl-L-lysine having the structural formula of Figure 2. Its hydrolysis in acid solution gives biotin and L-lysine. When the biocytin is allowed to slowly crystallize from aqueous acetone, its sinters at 225° C. and melts at 245–250° C. When allowed to crystallize rapidly from aqueous methanol or acetone, it melts at 228–230° C.

A sample of biocytin was recrystallized from aqueous acetone in the presence of about one equivalent of hydrochloric acid. The recovered crystalline material melted at about 227° (dec., microblock), and showed the presence of halogen.

Anal. Calcd. for $C_{16}H_{29}N_4O_4SCl$: C, 46.99; H, 7.15; N, 13.70. Found: C, 46.55; H, 6.74; N, 14.20.

A sample of biocytin which was recrystallized from neutral aqueous acetone was analyzed.

Anal. Calcd. for $C_{16}H_{28}N_4O_4S$: C, 51.59; H, 7.58; N, 15.04. Found: C, 52.80; H, 7.60; N, 14.71.

The infrared absorption spectra of biocytin when dispersed in petrolatum is shown in Figure 1.

This application is a continuation-in-part of our co-pending application Serial No. 107,146, filed July 27, 1949, now abandoned.

What is claimed is:

1. The process of isolating biocytin from a yeast extract in which it is present, which comprises adding water to the extract to obtain a solution containing the biocytin, mixing the solution with activated carbon, removing the adsorbed biocytin from the carbon by an alkaline eluant, concentrating and substantially neutralizing the eluate, adding the eluate to a chromatographic column of fuller's earth, washing the column to remove inactive constituents, removing the adsorbed biocytin by an alkaline eluant, concentrating and acidifying the eluate, readdition of the acidified eluate upon a chromatographic column containing five times as much fuller's earth as the dry content of the eluate, fractionally eluting the column with water, recovering the fractions containing biocytin, adding alcohol to precipitate inert materials, adsorbing the alcoholic solution on alumina, fractional elution of the alumina and recovery of selected fractions containing biocytin, mixing the selected eluate fractions from the alumina with cresol, then mixing the cresol with water and a compound selected from the group consisting of ether and ethyl acetate to dissolve the biocytin in the water, separating the water from the cresol mixture, concentrating the water and evaporating to obtain a product having a high biocytin content.

2. The process of isolating biocytin from animal and fermented vegetable substances, which comprises mixing an aqueous solution of the substance with activated carbon, removing the adsorbed biocytin from the carbon with an alkaline eluant, concentrating the eluate and adjusting it to substantial neutrality, adding the eluate to a chromatographic column of fuller's earth, washing the column to remove inactive constituents, removing the adsorbed biocytin by an alkaline eluant, concentrating the eluate and acidifying it to substantial neutrality, readdition of the acidified eluate upon a chromatographic column containing five times as much fuller's earth as the dry content of the eluate, removing the adsorbed biocytin with water and recovering the fractions containing biocytin, adding the selected fractions to alumina, removing the adsorbed biocytin with aqueous alcohol and recovering the fractions containing biocytin, mixing the latter selected fractions with cresol, then mixing the cresol; with water and a compound selected from the group consisting of ether and ethyl acetate to dissolve the biocytin in the water, separating the water from the cresol mixture, concentrating the water and evaporating to obtain a product having a high biocytin content.

References Cited in the file of this patent

Wright et al.: Proc. Soc. Exptl. Biol., vol. 56, pp. 95–98 (1944).

Wright et al.: Science, vol. 114, pp. 635–6 (1951).

Wright et al.: JACS, vol. 74, pp. 1996–8 (1952).